United States Patent
Conte et al.

(10) Patent No.: US 7,939,127 B2
(45) Date of Patent: May 10, 2011

(54) METHOD FOR OBTAINING A MARK ON A LOW SURFACE ENERGY OPHTHALMIC LENS

(75) Inventors: Dominique Conte, Saint-Dizier (FR); Gerhard Keller, St Maur des Fosses (FR); Gerard Willemin, Champigny sur Marne (FR)

(73) Assignee: Essilor International (Compagnie General d'Optique), Charenton-le-Pont (FR)

( * ) Notice: Subject to any disclaimer, the term of this patent is extended or adjusted under 35 U.S.C. 154(b) by 1479 days.

(21) Appl. No.: 10/535,146

(22) PCT Filed: Nov. 7, 2003

(86) PCT No.: PCT/FR03/03334
§ 371 (c)(1),
(2), (4) Date: May 16, 2005

(87) PCT Pub. No.: WO2004/046791
PCT Pub. Date: Jun. 3, 2004

(65) Prior Publication Data
US 2006/0051501 A1    Mar. 9, 2006

(30) Foreign Application Priority Data
Nov. 15, 2002  (FR) ................................. 02 14356

(51) Int. Cl.
*B65B 33/00* (2006.01)
*C09D 5/00* (2006.01)
*C09D 5/20* (2006.01)
*B05D 5/06* (2006.01)

(52) U.S. Cl. ........ 427/154; 427/155; 427/162; 427/164; 427/165; 427/532

(58) Field of Classification Search .................. 427/154, 427/155, 162
See application file for complete search history.

(56) References Cited

U.S. PATENT DOCUMENTS

| 2,536,075 | A | * | 1/1951 | MacNutt ......................... 134/28 |
| 3,657,085 | A | | 4/1972 | Hoffmeister et al. |
| 4,145,125 | A | | 3/1979 | Chika |
| 5,190,807 | A | * | 3/1993 | Kimock et al. ................ 428/216 |
| 6,238,847 | B1 | | 5/2001 | Axtell et al. |
| 6,281,468 | B1 | * | 8/2001 | Souel et al. .............. 219/121.11 |
| 2002/0176988 | A1 | * | 11/2002 | Medwick et al. ............. 428/408 |
| 2003/0049370 | A1 | * | 3/2003 | Lacan et al. .................. 427/165 |

FOREIGN PATENT DOCUMENTS

| EP | 0 528 540 | 2/1993 |
| EP | 0 614 957 | 9/1994 |

* cited by examiner

*Primary Examiner* — Frederick J Parker
*Assistant Examiner* — Michael Wieczorek
(74) *Attorney, Agent, or Firm* — Young & Thompson

(57) ABSTRACT

A method for marking an ophthalmic lens with a hydrophobic and/or oil-repellent low surface energy outer layer on a high surface energy substrate or coating. The method consists in: positioning a complementary patterning mask of the desired marking between the lens surface to be marked and an energizing discharge source capable of substantially eliminating the outer layer to as to expose the subjacent high energy substrate or coating. The temporary protective layer has a surface energy higher than that of the outer layer and a thickness less than about 5 nm, and preferably between 2 and 4 nm, thereby enabling the discharge to act on the outer layer through the temporary protective layer.

24 Claims, 1 Drawing Sheet

METHOD FOR OBTAINING A MARK ON A LOW SURFACE ENERGY OPHTHALMIC LENS

Figure 1:
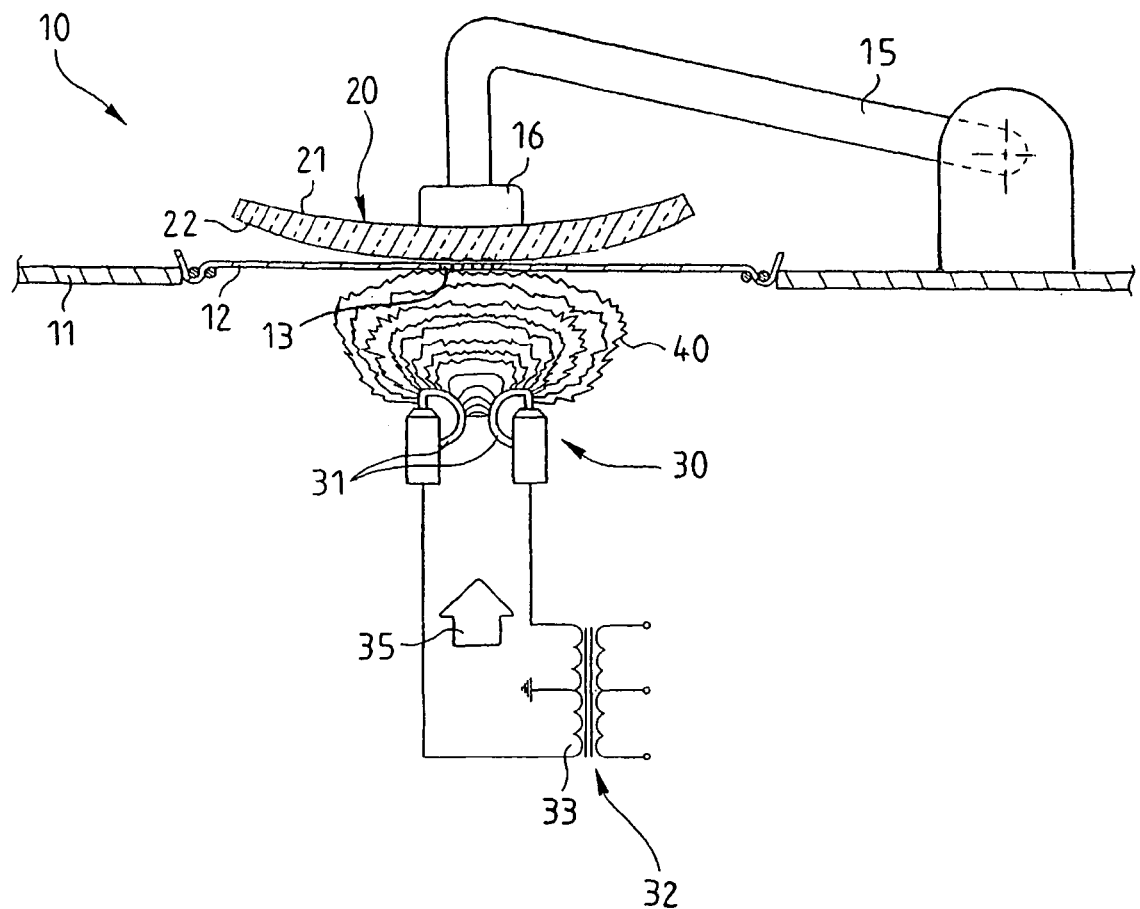

The present invention relates to marking ophthalmic lenses, and in particular eyeglass lenses, for identifying the source, the manufacturer and/or the technical characteristics of the lens, as well as for applying distinctive signs such as a logo. Such marks are known as "monograms". There are many methods for marking ophthalmic lenses, some of which involve removing material from the ophthalmic lens and/or the coatings thereof, in particular by etching or by means of lasers, and in particular by means of excimer lasers.

The latest generation ophthalmic lenses usually include a hydrophobic and/or oleophobic surface coating to resist smudge associated with an antireflection coating. The antireflection coating, which may comprise a single layer or multiple layers, consists of a material of high surface energy. A thin protection layer of a low surface energy organic material is deposited on this antireflection coating. This thin layer reduces oily deposits and other forms of soiling and in practice constitutes a hydrophobic and/or oleophobic surface coating.

Marks of the above kind are preferably invisible under normal circumstances so as not to irritate the wearer. They are rendered visible by misting the lens, the thin film of condensation that forms on the surface producing microdroplets on the low surface energy portions, whereas on the high surface energy portions the film of condensation spreads over the whole of the surface, forming larger droplets. In ambient lighting, diffusion by the microdroplets produces a much lighter tone than the larger droplets.

The publication WO 01/68384, in the name of the present applicant, describes a method and a device for marking low surface energy ophthalmic lenses using an energization discharge that selectively increases the surface energy corresponding to the cut-outs in a mask placed between the discharge and the ophthalmic lens to be marked. This kind of mask comprises a flexible film applied under mechanical tension to the surface to be marked or a layer of ink applied to said surface and subsequently removed using an appropriate solvent. In a preferred embodiment, the energization discharge is a corona discharge.

In the method described in the PCT application WO 01/68384, the energization discharge produces a chemical reaction with only the antismudge coating, which breaks the latter's molecular bonds and thereby destroys the integrity of the antismudge coating, so revealing the higher energy surface of the underlying antireflection coating. The resulting marking is clearly visible on misting the lens.

The above method is effective and gives good results.

Following surface treatments, the ophthalmic lens undergoes a trimming operation that involves machining the edge or periphery of the lens to match it to the dimensions of the rim of the frame to which it is to be fitted.

Trimming is normally carried out on a grinding machine. During this operation, the lens is held by holding members acting axially. Movement of the lens relative to the grinding wheel is numerically controlled to obtain the required peripheral contour. The holding members have to hold the lens during trimming.

A holding device is placed on the convex face of the lens with a retaining shoe, such as a double-sided adhesive pad, disposed between the holding device and the convex face of the lens. An axial clamping member clamps the concave face of the lens via a buffer that is normally made of elastomer.

During trimming, if the holding members are not sufficiently effective, tangential cutting may cause the lens to rotate relative to the holding members, leading to rejection of the trimmed lens. Proper retention of the lens depends mainly on good adhesion at the interface between the retaining shoe and the convex face of the lens.

Hydrophobic and/or oleophobic antismudge surface coatings, usually of the fluorosilane type, have now become so effective that adhesion at the interface between the retaining shoe and the convex face of the lens is degraded or even compromised. This applies to polycarbonate lenses in particular, whose trimming generates forces much higher than those necessary for other materials. This results in a high percentage of lenses rejected because they have not been trimmed correctly.

To overcome this problem, it has been proposed to provide an adhesion layer on top of the antismudge coating, conferring upon the lens a surface energy greater than that of the outermost layer, i.e. the antismudge coating. This temporary protection layer may be applied to the whole of the convex face of the lens or only to the central region that receives the retaining shoe. Thanks to the temporary protection layer, the maximum off-axis error is 2° or even 1° or less.

The protection layer consists of any materials for increasing the surface energy and adapted to be eliminated after trimming without modifying the optical properties of the lens and the qualities of the relevant face of the lens. The temporary protection layer is preferably a mineral layer, more particularly a layer of a metal fluoride or a mixture of metal fluorides, a metal oxide or a mixture of metal oxides, for example magnesium fluoride ($MgF_2$), lanthanum fluoride ($LaF_3$), aluminum fluoride ($AlF_3$) or cerium fluoride ($CeF_3$) mixtures of alumina and praseodymium oxide are recommended. A protection layer of the above kind can be deposited by any conventional method, but preferably by evaporation in a vacuum enclosure, as is generally the case for antireflection and hydrophobic and/or oleophobic antismudge coatings.

The temporary protection layer is preferably from 5 to 50 nm thick. If the protection layer is too thin, the resulting modification of the surface energy may be insufficient, whereas if it is too thick, there is a risk of mechanical stresses being generated inside the layer, which may prejudice the expected properties.

Finally, the temporary protection layer preferably has a minimum degree of transparency, for example at least 18% or even at least 40%, as defined in the ISO standard 8980/3, enabling standard power measurements on the lens carrying its protective layer by means of a focimeter.

Alternatively, conventional inks for marking ophthalmic lenses and/or resins constituting the binder of such inks may be used. With organic protection layers, much greater thicknesses can be obtained, from 5 to 150 µm. Alkyde type resins are satisfactory.

Antireflection coatings and hydrophobic/oleophobic coatings are generally deposited by evaporation in a vacuum. The lenses on which antireflection and antismudge coatings have been deposited are placed above orifices in a turntable in the vacuum enclosure and their periphery rests on a ring fastened to the turntable by holding means. The treatment device is situated in the lower portion of the enclosure and comprises a crucible in which the material to be evaporated is placed and that is generally heated by means of an electron beam or a dual effect source, depending on the nature of the material to be evaporated.

The material to be evaporated to constitute a coating layer is deposited on the face of the lens to be treated until the required thickness is obtained, at which point the evaporation of this first material is stopped. The next material is then evaporated. As a general rule, all of the coatings are deposited on one face of the lens. then, after turning the lens over, all of the coatings are deposited on the other face of the lens, this set of coatings normally being identical to that deposited on the first face of the lens.

Obviously, when treating the second face, the integrity of the layers deposited on the first face must be protected, especially the integrity of the outermost layer. The hydrophobic and/or oleophobic antismudge coating is very thin, having a thickness from 2 to 10 nm or even from 2 to 5 nm. Now, it is sometimes necessary to treat the face of the lens using very energetic substances, i.e. substances whose energies exceed 0.1 eV, or reactive substances, i.e. substances liable to react chemically with the surface of the lens. In particular, before depositing multilayer antireflection coatings, the ophthalmic lens undergoes surface preparation, such as ionic bombardment (for example with rare gases, oxygen, mixtures thereof, nitrogen or air), plasma treatment or discharge treatment (typically treatment by an oxygen plasma at a pressure of $10^{-2}$ mbar). It may also be necessary to carry out an activation treatment in order to prepare a surface before depositing a coating layer, for example to increase the adhesion of the layer. Similarly, ionic bombardment may be applied during evaporation of the materials to improve its mechanical properties and in particular to densify the layer (this is known as ionically assisted deposition (IAD)).

The substances generated are highly energetic and/or reactive and are liable to degrade the deposit on the first face of the lenses and in particular those situated at the periphery of the turntable. The same problem is encountered if the lenses to be treated have an overall shape similar to that of the lens when ready for mounting, depending on the frame, the energetic and/or reactive substances then being able to pass between the circular orifice in the turntable and the peripheral edge of the lens to whose first face a deposit has been applied.

To overcome this problem, depositing a temporary protective layer on the thin outermost antismudge layer, i.e. the external layer of the lens, in order to protect the outermost layer of the first face of the lens when depositing coating layers on the second face in a vacuum enclosure has been envisaged.

This temporary protection layer must be thick enough to prevent degrading the properties of the thin outermost layer and is chosen as a function of the surface energy of the substances, which can vary from 40 to 150 eV with a current density at the lens surface from 30 to 700 $\mu A/cm^2$. The thickness of the protection layer is preferably from 5 nm to 10 $\mu m$ for this application. If the protection layer is a mineral layer deposited by evaporation, its thickness is preferably from 5 to 200 nm. In all cases, the protection layer must not be too thin, to avoid the risk of insufficiently protecting the thin hydrophobic and/or oleophobic outermost layer, or too thick, in particular for the essentially mineral protection layers, to prevent the risk of mechanical stresses appearing within the layer, which would be prejudicial to its properties.

The layer used for this purpose may have the same composition as the adhesion layer referred to above. Mixtures of alumina and praseodymium oxide are also recommended for this purpose.

Organic material temporary protection layers include those based on polytetrafluoroethylene (PTFE), for example that sold under the trade mark TEFLON®.

A multilayer temporary protection coating, and in particular a two-layer coating, may also be envisaged, the first layer being a thin mineral layer (from 5 to 200 nm thick), while the second layer is organic and can be obtained by depositing and hardening a latex. This layer is thicker, from 0.2 to 10 $\mu m$ thick.

The organic layer provides good mechanical protection and can be peeled off easily. The organic layer is selected so that its adhesion to the mineral first layer is greater than that to the interface between the mineral first layer and the hydrophobic and/or oleophobic layer. Thus the mineral layer is also removed on peeling off the organic layer.

Now, depositing a temporary protection layer to ensure good adhesion between a retaining shoe and the convex face of the lens and/or to protect the first face of the lens during treatment with highly energetic or reactive substances forms a screen or mask in front of the corona discharge source which prevents the discharge reaching the thin low surface energy layer through the temporary protection layer in one or the other of the applications cited above.

It has therefore been necessary to carry out the corona treatment before depositing the temporary protection layer, which has involved transferring the lens from the vacuum enclosure to the corona treatment device and then returning it to the vacuum enclosure to deposit the temporary protection layer.

It has been found, unexpectedly, that the corona treatment can be carried out on the thin hydrophobic and/or oleophobic layer through the temporary protection layer provided that it is less than approximately 5 nm thick, i.e. has a thickness that until now has been considered insufficient for one or the other of the applications cited above. It proves that, despite the fact that the temporary protection layer is very thin, this layer proves adequate in both the applications cited above.

Thus one aspect of the present invention is a method for marking one face of an ophthalmic lens of the type including a low surface energy hydrophobic and/or oleophobic outermost layer on a substrate or a high surface energy coating, wherein a mask having a configuration complementary to the required mark is positioned between the face of the lens to be marked and an energizing discharge source adapted to oxidize the outermost layer in order to reveal the substrate or underlying high energy coating, which method is characterized in that there is deposited onto said outermost layer a temporary protection layer having a surface energy higher than that of the outermost layer and a thickness of less than about 5 nm to enable the discharge to act on the outermost layer through the temporary protection layer.

The protection layer is preferably a mineral layer deposited by evaporation and comprises, for example, a metal fluoride or a mixture of metal fluorides, such as $MgF_2$, $LaF_2$, $AlF_3$ or $CeF_3$, or a metal oxide or a mixture of metal oxides, such as $TiO_2$, $Al_2O_3$, $ZrO_2$ and praseodymium oxide and the mixture of metal oxides is a mixture of alumina and praseodymium oxide.

The temporary protection layer may have a substantially continuous structure or a discontinuous structure, in particular in the form of a screen.

In a different embodiment the temporary protection layer is an organic material and is preferably based on polytetrafluoroethylene.

Alternatively, the protection layer consists of a marking ink for ophthalmic lenses and/or a polymer constituting a marking ink binder.

The temporary protection layer is preferably eliminated after trimming the lens, in particular by an acid solution, by dry wiping or by application of ultrasound.

In practice, deposition of the hydrophobic and/or oleophobic outermost layer on a first face of the lens is preceded by the deposition of one or more mineral or organic layers, characterized in that at least one step of treatment by energetic and/or reactive substances capable of attacking and/or chemically modifying the surface of the first face of the lens is effected before the deposition of the mineral or organic layer (s). The lens can then be turned over to treat its second face by energetic and/or reactive substances before depositing one or more mineral or organic layers and a hydrophobic and/or oleophobic outermost layer. A temporary protection layer can then be deposited on the hydrophobic and/or oleophobic outermost layer on the second face of the lens to improve its adhesion to the holding member that cooperates with this second face during trimming.

The marking as such is carried out using the method described in PCT application WO 01/68384. Although the corona discharge source is the preferred energization source for selectively oxidizing the outermost hydrophobic and/or oleophobic layer, other sources can be used, such as a cold plasma or ultraviolet radiation source for photo-oxidation of the molecules of the hydrophobic and/or oleophobic outermost layer.

Figure 2:
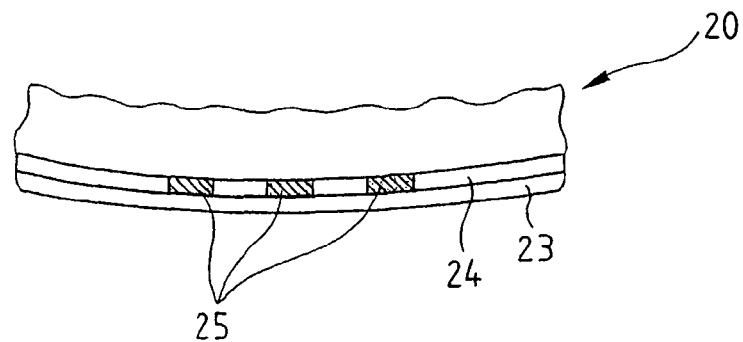

The invention is described with reference to the appended drawing, in which:

FIG. 1 is a diagrammatic view of low-frequency corona treatment apparatus for marking a lens, and FIG. 2 is a partial diagrammatic view of a lens of the invention following corona treatment through a temporary protection layer.

A lens treated in accordance with the present invention comprises a mineral or organic glass substrate. The two faces of the lens carry different layers, some of which are deposited one on top of the other, by evaporation of materials contained in a crucible, using an electron gun or by the Joule effect, in a vacuum enclosure. There may be cited in particular the Balzers BAK 760 machine equipped with an electron gun, an ion gun of the end-Hall, Commonwealth Mark 2 type and a Joule effect evaporation source, or the Leybold 1104 vacuum treatment machine equipped with an electron gun and a Joule effect evaporation source. Before depositing a first layer on a first face, preferably the convex face, that face is treated with the energetic and/or reactive substances, in particular by ionic bombardment, for example with a beam of ions of argon and oxygen, using the ion gun, or plasma treatment to chemically modify the surface in order to improve the adhesion of the deposit.

The first coating usually comprises an antiabrasion layer, in particular of the polysiloxane type corresponding to example 3 of European patent application N° 0.614.957, which protects the substrate from scratches, especially if it is a polycarbonate organic substrate, which has a high surface energy.

Onto this first coating is then deposited a single-layer or multilayer antireflection coating having a high surface energy. A coating of this kind is preferably a multilayer coating in which the layers are successively of high and low refractive index and may comprise, for example, a first layer consisting of $ZrO_2$, a second layer consisting of $SiO_2$, a third layer consisting of $ZrO_2$, and a fourth and final layer consisting of $SiO_2$. A coating of this kind is relatively insensitive to energizing discharges, such as corona, cold plasma or ultraviolet irradiation discharges. Because of this, marking by means of such energizing discharges leaves the antireflection coating layers substantially intact, and in particular the outermost layer. It goes without saying that other antireflection coatings may be used, and in particular those consisting of a plurality of mineral layers. Similarly, other methods of depositing antireflection coating layers may be used, and in particular cathode sputtering or plasma-assisted vapor phase chemical reaction methods.

The hydrophobic and/or oleophobic external coating is then deposited on the antireflection coating by evaporation in a Joule effect crucible of an Optool DSX compound from Daikin comprising perfluoropropylene groups. The thickness of this kind of hydrophobic and oleophobic coating is less than 10 nm, even 5 nm, and is preferably 2 nm. Its surface energy is less than 14 millijoules/m$^2$ and preferably equal to or less than 12 millijoules/m$^2$.

According to the invention, a temporary protection layer less than 5 nm thick is deposited, also by evaporation, and preferably in the same vacuum enclosure, onto the hydrophobic and/or oleophobic coating, over the whole of the treated face, to protect it during the treatment of the other face of the lens, or where applicable over a region intended to come into contact with the retaining shoe, in particular when the convex face is treated in the vacuum enclosure after the concave face and protection against energetic and/or reactive substances is therefore not indispensable.

The temporary protection layer is a mineral layer consisting of a metal fluoride or a mixture of metal fluorides or a metal oxide or a mixture of metal oxides, for example. $MgF_2$ from Merck with a mean particle size of 2.5 mm is preferably used, and is placed in the crucible and evaporated by the electron gun. The rate of deposition is approximately 0.50 nm/s, and the position takes from 4 to 8 seconds, producing a temporary protection layer from about 2 nm to about 4 nm thick. The thickness deposited is controlled by a quartz microbalance.

After the temporary protection layer has been deposited, the enclosure is heated and the treatment chamber vented to atmosphere before turning over the lenses. The treatment steps already described are then repeated on the second face of the lens. The temporary protection layer, preferably of $MgF_2$, deposited on the convex face is intended to increase the surface energy thereof to improve adhesion during trimming.

After the coating layers have been deposited on both faces of the lens, the lens is taken out of the enclosure for marking in a low-frequency corona treatment device 10 shown diagrammatically in FIG. 1 and including a Mylar® screen or mask 12 tensioned by a Mylar® tensioning mechanism. This screen includes a cut-out 13 that is complementary to the pattern that will be marked on the lens 20 and is held by a pivoting arm 15 (represented here in a position at 90° to its normal position to simplify the diagram) and urged toward a position in which its retaining shoe 16 engages with the center of the convex face 21 of the lens, so that the corresponding region of the convex face 22 is in intimate and continuous contact with the portion of the screen including the marking cut-out.

A Softal-3DT MultiDyne corona discharge device 30 is installed under the screen inside a housing of which only the top plate 11 is represented and comprises two hook-shaped or D-shaped wire electrodes 31 having a straight portion followed by a semicircular portion. The semicircular portions face each other. The distance between the electrodes and the lens to be treated is approximately 5 mm. This enables treatment of an oval region whose major axis can be up to 65 mm long. These electrodes are connected to the secondary windings 33 of a 12 kV high-tension transformer 32. For safety reasons, the secondary windings have a grounded center tap which halves the voltage between the high-tension conductors and ground. A constant flow of pressurized air is directed between the electrodes by a source 35, preferably a fan. The effect of this flow of air is to divert the electrical arc 40 and to spread it with a curvature that is determined by the configuration of the electrodes. The higher the voltage and the higher the velocity of the flow of air, the more the arc spreads. Arcs are produced for 5 seconds at a constant rhythm of 50 to 60 cycles/second. The continuous arc produces a corona discharge with very highly charged ions. This energy field is capable of disintegrating the thin hydrophobic and/or oleophobic coating facing the cut-outs 13 in the screen 12 through the protection layer deposited on the coating and whose thickness is less than about 5 nm, preferably from about to 2 to about 4 nm, and more preferably about 2 nm. The device includes means (not shown) for regulating the air flow. It can further include a system for filtering and extracting ozone produced in the corona treatment that converts the ozone into oxygen, the gas filtered in this way escaping from under the housing.

FIG. 2 is a diagrammatic partial view to a larger scale of a portion of the temporary protection layer 23 on the convex face 22 and the hydrophobic and/or oleophobic layer 24 onto which the temporary protection layer is deposited and which includes regions 25 disintegrated by the energizing discharge source to expose the surface of the outermost layer of the antireflection coating having a high surface energy. The lens is then trimmed to fit it to the rim of the frame. This trimming of the lens may be carried out on an Essilor Gamma grinding machine, for example, the lens being held between a retaining shoe, in this instance a 25 mm diameter 3M self-adhesive pad that cooperates with the convex face and an Essilor holding device of the same diameter. The off-axis error during trimming is less than 1° and therefore perfectly satisfactory.

The temporary protection layer may then be eliminated by dry wiping with a cotton cloth or in a liquid medium. It is preferably eliminated in a liquid medium using an acid solution, in particular a 0.01 to 1 N solution of orthophosphoric acid. This solution may also contain cationic or amphoteric surfactants. The lens is dipped into the orthophosphoric acid solution in the ultrasound tank for two minutes at room temperature and then rinsed with water or isopropyl alcohol and dried. The temperature of the solution may vary, room temperature being satisfactory. The above two means may even be combined, namely dry wiping followed by cleaning in an aqueous solution with a pH substantially equal to 7. This layer can also be eliminated by ultrasound in a Branson B2200 E2 60 W ultrasound tank.

EXAMPLE 1

A first coating is deposited comprising a polysiloxane antiabrasion layer corresponding to example 3 of European patent application N° 0.614.957, followed by an antireflection coating comprising a succession of four layers consisting of $ZrO_2$, $SiO_2$, $ZrO_2$, $SiO_2$, and then a Shinetsu KP801M fluorosilazane coating layer. The lens is then monogrammed with the corona discharge device described above, the process taking 5 seconds.

EXAMPLE 2

A first coating is deposited comprising a polysiloxane antiabrasion layer corresponding to example 3 of European patent application N° 0.614.957, followed by an antireflection coating comprising a succession of four layers consisting of $ZrO_2$, $SiO_2$, $ZrO_2$, $SiO_2$, and then a Daikin Optool DSX coating layer containing perfluoropropylene groups. The lens is then monogrammed as in example 1.

EXAMPLE 3

A 20 nm thick temporary protection layer of $MgF_2$ is deposited onto another lens prepared as in example 1. The lens is then monogrammed as in example 1, but for 10 seconds. The temporary protection layer is then eliminated by wiping with a Selvyt® polishing cloth.

EXAMPLE 4

The example 3 procedure is followed, with monogramming effected in five periods each of 10 seconds duration, i.e. a total of 50 seconds.

EXAMPLE 5

A 20 nm thick temporary protection layer of $MgF_2$ is deposited onto another lens prepared as in example 2. The lens is then monogrammed as in example 1, but for 10 seconds, after which the temporary protection layer is eliminated by wiping with a Selvyt® polishing cloth.

EXAMPLE 6

The procedure of example 5 is followed with monogramming effected in five periods each of 10 seconds duration, i.e. a total of 50 seconds.

EXAMPLE 7

A 2 nm thick temporary protection layer of $MgF_2$ is deposited onto another lens prepared as in example 1. The lens is then monogrammed as in example 1, after which the temporary protection layer is eliminated by wiping with a Selvyt® polishing cloth.

EXAMPLE 8

A 2 nm thick temporary protection layer of $MgF_2$ is deposited onto another lens prepared as in example 2. The lens is then monogrammed as in example 1, after which the temporary protection layer is eliminated by wiping with a Selvyt® polishing cloth.

All of the lenses treated as above are then misted cold in order to show the monogrammed pattern. The monogramming on the lenses of examples 1 and 2 is good. The complementary high surface energy regions corresponding to the cut-outs of the screen are covered with a film of condensation comprising large droplets and of dark appearance under ambient lighting, whereas on the low surface energy regions protected by the screen the film of condensation consists of microdroplets of a much lighter tone.

Misting the lenses of examples 7 and 8 obtains the same good quality condensation patterns as with the lenses of examples 1 and 2. Furthermore, the optical and physical qualities of the outermost coating, i.e. the hydrophobic and/or oleophobic antismudge coating of the lens, after elimination of the temporary protection layer as in examples 7 and 8, are virtually identical to those of the lens before depositing the temporary protection layer onto the lenses as in examples 1 and 2.

On the other hand, misting the lenses from examples 3 and 5 does not show up condensation patterns complementary to the cut-outs in the screen. Similarly, with examples 4 and 6, the misting in the regions complementary to the cut-outs of the screen consists of microdroplets larger than those in the regions protected by the screen, but the contrast between these regions is very low and therefore the monogramming is of mediocre quality.

In the embodiment described, the energizing discharge source is a corona discharge source. Other energizing discharge sources may be used, such as a cold plasma source or a source of ultraviolet radiation, for example.

A cold plasma source may comprise an electrical or microwave discharge or a luminescent discharge source. An electrical or microwave source can produce a discharge in a gas such as oxygen, argon, nitrogen, carbon tetrafluoride, helium or ammonium at reduced pressures of the order of 1 millibar. The duration of the discharge may vary from a few seconds to a few tens of seconds and is preferably of the order of several seconds. Atea manufactures the Matis cold plasma discharge source. It is also possible to use a Lectro Treat cold plasma discharge source, which produces a hybrid corona discharge at atmospheric pressure.

An ultraviolet radiation source will produce photo-oxidation of the molecules at the irradiated surface. Molecular dissociation is obtained with wavelengths of the order of 2357 A° and 1849 A°. A Uvocs surface decontamination unit may be used as a source of ultraviolet radiation for the purposes of the present invention.

Similarly, instead of the screen described in the preferred embodiment, another form of mask may be used, for example a layer of ink applied directly to the surface to be marked, as described in the publication WO 01/68384 cited above.

Such other energizing discharges are also liable to disintegrate selectively the hydrophobic and/or oleophobic layer, in particular by oxidation or destruction of covalent bonds.

Of course, many modifications may be made to the embodiments described hereinabove without departing from the scope of the invention.

The invention claimed is:

1. Method for marking one face of an ophthalmic lens of the type including a hydrophobic and/or oleophobic outermost layer on a substrate or an underlying coating having a higher surface energy than the hydrophobic and/or oleophobic outermost layer, wherein a mask having a configuration complementary to a required mark is positioned between the face of the lens to be marked and an energizing source adapted to eliminate selectively the outermost layer in order to reveal the substrate or underlying coating, and wherein there is deposited onto said outermost layer a temporary adhesion enhancing layer for enhancing adhesion of the face of the lens with a lens retaining shoe when trimming the lens, said temporary adhesion enhancing layer having a surface energy higher than that of the outermost layer and a thickness of less than about 5 nm and wherein the energizing source acts on the outermost layer through the temporary adhesion enhancing layer.

2. Method according to claim 1, wherein the thickness of the temporary adhesion enhancing layer is from approximately 2 nm to approximately 4 nm.

3. Method according to claim 1 wherein the adhesion enhancing layer is a mineral layer.

4. Method according to claim 1, wherein the adhesion enhancing layer comprises a metal fluoride or a mixture of metal fluorides or a metal oxide or a mixture of metal oxides.

5. Method according to claim 4, wherein the metal fluoride is $MgF_2$, $LaF_2$, $AlF_3$ or $CeF_3$.

6. Method according to claim 4, wherein the oxide is selected from $TiO_2$, $Al2O_3$, $ZrO_2$ and praseodymium oxide and the mixture of alumina and praseodymium oxide.

7. Method according to claim 1, wherein the adhesion enhancing layer is deposited by evaporation.

8. Method according to claim 1, wherein the temporary adhesion enhancing layer is deposited on a region of the face intended to be in contact with the lens retaining when trimming the lens.

9. Method according to claim 1, wherein the adhesion enhancing layer has a substantially continuous structure.

10. Method according to claim 1, wherein the adhesion enhancing layer has a discontinuous structure.

11. Method according to claim 1, wherein the adhesion enhancing layer takes the form of a screen.

12. Method according to claim 1, wherein the temporary adhesion enhancing layer comprises polytetrafluorethylene.

13. Method according to claim 1, wherein the adhesion enhancing layer comprises a marking ink for ophthalmic lenses and/or polymer constituting a marking ink binder.

14. Method according to claim 1, wherein the hydrophobic and/or oleophobic outermost layer comprises fluorinated groups.

15. Method according to claim 1, wherein the lens comprises an antireflection coating onto which the hydrophobic and/or oleophobic outermost layer is deposited.

16. Method according to claim 15, wherein the hydrophobic and/or oleophobic outermost layer includes a plurality of layers.

17. Method according to claim 1, wherein the temporary adhesion enhancing layer is removed by an acid solution.

18. Method according to claim 1, wherein the temporary adhesion enhancing layer is removed by dry wiping.

19. Method according to claim 1, wherein the temporary adhesion enhancing layer is removed by application of ultrasound.

20. Method according to claim 1, wherein the temporary adhesion enhancing layer is removed and thereafter a cleaning step is carried out using an aqueous solution with a pH substantially equal to 7.

21. Method according to claim 1, wherein the deposition of the hydrophobic and/or oleophobic outermost layer on a first face of the lens is preceded by the deposition of one or more mineral or organics layers, wherein at least one step of treatment by energetic and/or reactive substances capable of attacking and/or chemically modifying the surface of the first face of the lens is effected before the deposition of the mineral or organic layer(s).

22. Method according to claim 21, wherein the lens is turned over to treat its second face by energetic and/or reactive substances before depositing one or more mineral or organic layers and a hydrophobic and/or oleophobic outermost layer.

23. Method according to claim 22, wherein a temporary adhesion enhancing layer is deposited on the hydrophobic and/or oleophobic outermost layer on the second face of the lens.

24. Method for marking one face of an ophthalmic lens of the type including a hydrophobic and/or oleophobic outermost layer on a substrate or an underlying coating having a higher surface energy than the hydrophobic and/or oleophobic outermost layer, wherein a mask having a configuration complementary a desired mark is positioned between the face of the lens to be marked and an energizing source adapted to eliminate selectively the outermost layer in order to reveal the substrate or underlying coating, and wherein there is deposited onto said outermost layer a temporary adhesion enhancing layer, said adhesion enhancing layer having a surface energy higher than that of the outermost layer and a thickness of less than about 5 nm, selectively eliminating the outermost layer through the temporary adhesion enhancing layer by action of the energizing source, and removing the adhesion enhancing layer from the ophthalmic lens after the outermost layer has been selectively eliminated from the lens to produce the desired mark and after the ophthalmic lens has been trimmed to the desired contour.

* * * * *